United States Patent [19]
Crawford et al.

[11] Patent Number: 5,797,038
[45] Date of Patent: Aug. 18, 1998

[54] METHOD AND SYSTEM FOR SERIALLY BASED HOST/PERIPHERAL COMMUNICATION

[75] Inventors: Robert Dennis Crawford, Livonia; Bradley Earl BeMent, Farmington Hills, both of Mich.

[73] Assignee: Ford Motor Company, Dearborn, Mich.

[21] Appl. No.: 709,945

[22] Filed: Sep. 9, 1996

[51] Int. Cl.[6] ................................................ G06F 13/00
[52] U.S. Cl. ............................................................ 395/868
[58] Field of Search .................................. 395/868, 734, 395/741

[56] References Cited

U.S. PATENT DOCUMENTS

| | | |
|---|---|---|
| 4,816,996 | 3/1989 | Hill et al. |
| 4,958,277 | 9/1990 | Hill et al. |
| 5,023,778 | 6/1991 | Simon, Jr. et al. |
| 5,303,227 | 4/1994 | Herold et al. ............................ 370/24 |
| 5,345,564 | 9/1994 | Jensen et al. ............................ 395/823 |
| 5,630,152 | 5/1997 | Deluca et al. ....................... 395/800.31 |

*Primary Examiner*—Glenn A. Auve
*Attorney, Agent, or Firm*—Paul K. Godwin; Roger L. May

[57] ABSTRACT

A method is provided for serial communication between a host device and a peripheral device. The method includes transmitting an interrupt command from the host to the peripheral in response to a peripheral interrupt signal and, substantially simultaneously, transmitting interrupt status data from the peripheral to the host, the interrupt status data representing a pending peripheral interrupt and indicating whether a communication error has occurred. The method also includes transmitting a continue code from the host to the peripheral based on the interrupt status data and, substantially simultaneously, transmitting information associated with the pending interrupt from the peripheral to the host in response to the interrupt command, the information having a predefined structure based on the interrupt status data for use in resolution of the pending interrupt. A system is also provided for performing the method.

20 Claims, 3 Drawing Sheets

METHOD AND SYSTEM FOR SERIALLY BASED HOST/PERIPHERAL COMMUNICATION

TECHNICAL FIELD

This invention relates to a serially based method and system for communication between a host device and a peripheral device.

BACKGROUND ART

One of the advantages of a serial interface between a peripheral device and a host microprocessor is that such an interface uses fewer data and control lines than a parallel interface. However, if the peripheral contains numerous internal registers and RAM locations, considerable time is consumed in the transfer of internal address information before actual status or control data is transferred by either the host microcontroller or the peripheral. In addition, these peripherals often generate interrupts from multiple sources and require an interrupt service response from the host microprocessor.

Traditional serial peripheral interface (SPI) methods and systems have been modified to at least partially address these problems. For instance, U.S. Pat. No. 5,303,227 issued to Herold et al. ("the Herold '227 patent") discloses a method and apparatus for enhanced modes in SPI communication. The method and apparatus of the Herold '227 patent use a "read-modify-write" command mode, and what is referred to as a "read-before-write" (more accurately a simultaneous "read" and "write") command mode to reduce the number of byte transfers needed to service the various peripheral requirements.

The method and apparatus of the Herold '227 patent, however, do not fully address the problems associated with SPI discussed above. More particularly, while the Herold '227 patent reduces the number of byte transfers needed between a host and a peripheral, it does not minimize such transfers. That is, "useless" bytes are still transferred between the host and the peripheral. Moreover, by using "read-modify-write" and "read-before-write" command modes, the method and apparatus of the Herold '227 patent may also propagate errors if data has been corrupted, since such command modes are inherently incapable of verifying the data transfers. This can be especially problematic in environments where signal noise may be encountered, such as in automobiles or the like.

Thus, a need exists for a serially based method and system for communication between a host and a peripheral device that further improves the efficiency of the interface by minimizing the number of byte transfers needed to service the various command, status, and interrupt requirements of the peripheral. Such a method and system would also utilize communication modes that would permit verification of data transfers to eliminate propagation of corrupted data which may be caused by noisy environments. Such a method and system would reduce both the amount of time and the number of Central Processing Unit (CPU) resources required to service the peripheral.

DISCLOSURE OF INVENTION

Accordingly, an object of the present invention is to provide an improved method and system for serial communication between a host device and a peripheral device.

According to the present invention, then, a method is provided for serial communication between a host device and a peripheral device. The method comprises transmitting an interrupt command from the host to the peripheral in response to a peripheral interrupt signal, and transmitting, substantially simultaneously to transmission of the interrupt command, interrupt status data from the peripheral to the host, where the interrupt status data represents a pending peripheral interrupt and indicates whether a communication error has occurred. The method of the present invention further comprises transmitting a continue code from the host to the peripheral based on the interrupt status data, and transmitting, substantially simultaneously to transmission of the continue code, information associated with the pending interrupt from the peripheral to the host in response to the interrupt command, where the information has a predefined structure for use in resolution of the pending interrupt.

The present invention also provides a system for serial communication between a host device and a peripheral device. The system comprises means for transmitting an interrupt command from the host to the peripheral in response to a peripheral interrupt signal, and means for transmitting, substantially simultaneously to transmission of the interrupt command, interrupt status data from the peripheral to the host, where the interrupt status data represents a pending peripheral interrupt and indicates whether a communication error has occurred. The system of the present invention further comprises means for transmitting a continue code from the host to the peripheral based on the interrupt status data, and means for transmitting, substantially simultaneously to transmission of the continue code, information associated with the pending interrupt from the peripheral to the host in response to the interrupt command, where the information has a predefined structure for use in resolution of the pending interrupt.

These and other objects, features, and advantages will be readily apparent upon consideration of the following detailed description in conjunction with the accompanying drawings.

BEST MODE FOR CARRYING OUT THE INVENTION

In general, the method and system of the present invention for serial communication between a host and a peripheral device are designed to minimize the number of serial byte transfers needed to service a peripheral device. This is especially true for peripheral devices which contain many different status and control registers.

In that regard, the present invention utilizes two main data transfer modes within the peripheral. The first mode of data transfer, where the host is responding to an interrupt request from the peripheral, is defined as Interrupt Response Mode (IRM). The second mode of data transfer, where the host is commanding the peripheral to take some other non-interrupt action, is defined as the command mode. These two modes each use pre-established sequences of data transfer which minimize or eliminate the need for internal address information to be transferred across the host interface.

Figure 1:
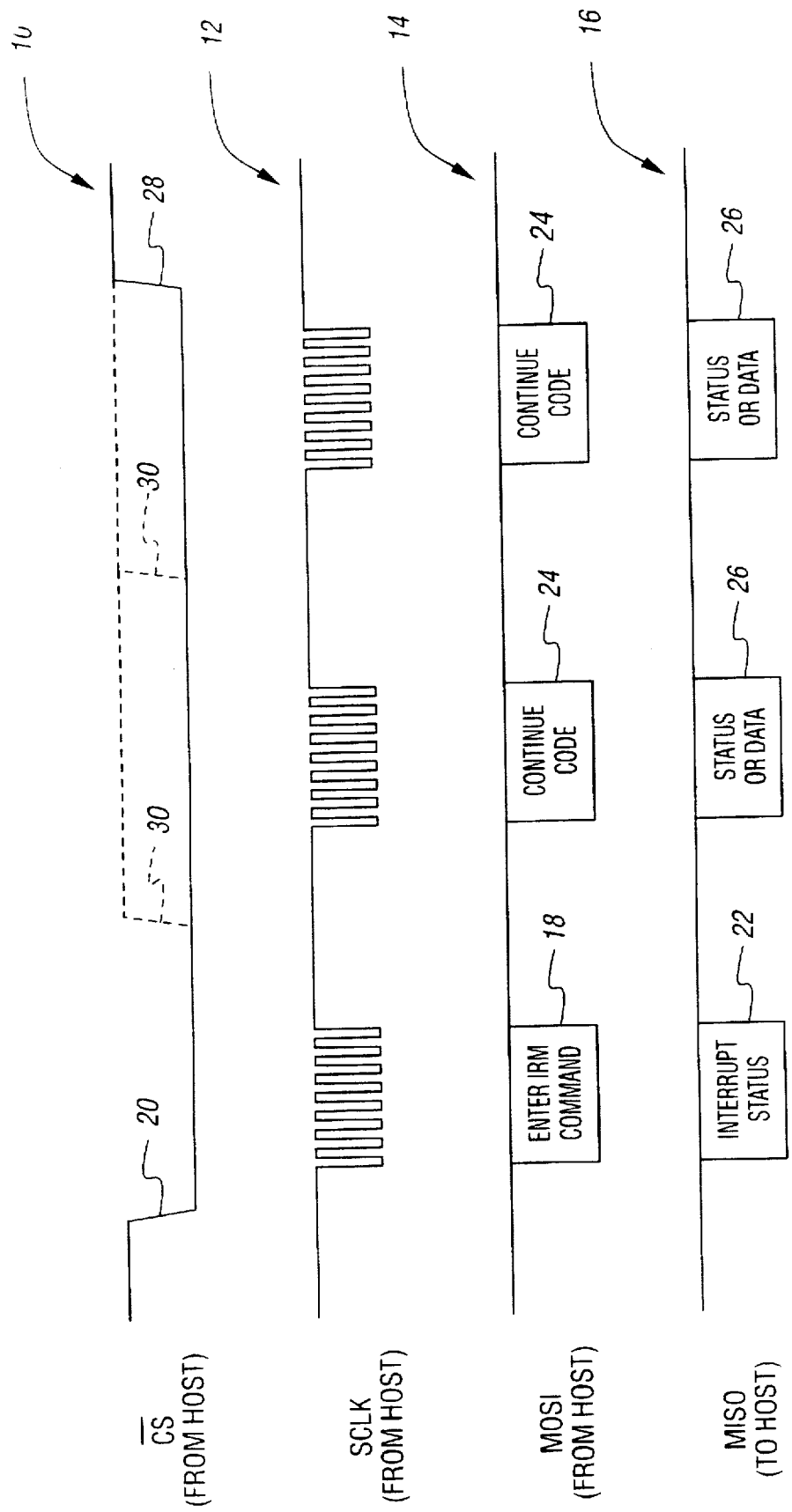
FIG. 1 illustrates a typical interrupt response mode transaction for use in the method and system of the present invention.

More specifically, the preferred embodiment of the method and system of the present invention will now be described with reference to FIGS. 1–3. Referring first to FIG. 1, a typical IRM transaction for use in the method and system of the present invention is shown. As seen therein, a number of host/peripheral interface signal lines are depicted over time including a chip select (CS) line (10) from the host to the peripheral, a serial clock (SCLK) line (12) originating from the host, a unidirectional data line (MOSI) (14) from the host to the peripheral, and a unidirectional data line (MISO) (16) from the peripheral to the host. This represents a typical SPI interface.

Preliminarily, the peripheral first sends an interrupt request to the host by pulling the interrupt line (57) (see FIG. 3) low. Thereafter, in response to the pending peripheral interrupt, IRM is entered when the host sends an "Enter IRM Command" (18) as the first serial byte transferred after activation of CS (10) at a falling edge (20). The peripheral internally latches the highest priority pending interrupt within the peripheral at the falling edge (20) of CS (10). This latched code is referred to as the Interrupt Status Byte (ISB) (22), which is transmitted from the peripheral to the host substantially simultaneously with the transmission of the Enter IRM Command (18) from the host to the peripheral. Lower priority interrupts are held off (retained) until the higher priority interrupt has been serviced. Interrupt status register (58) (see FIG. 3) clearing will only take place in Interrupt Response Mode.

Once the peripheral receives the Enter IRM Command (18) (and there was a pending interrupt within the peripheral), it is in Interrupt Response Mode. The peripheral then supplies information, which may comprise status bytes (indicating a device status such as operating voltage) and/or actual data bytes (26) appropriate to the source of the interrupt. The status and/or data bytes (26) sent from the peripheral to the host have a predefined structure based on the ISB (22). That is, as will be described in greater detail below, the contents of the ISB (22) indicate the source of the interrupt, which dictates the type, order and/or number of status and/or data bytes (26) which are sent from the peripheral to the host during Interrupt Response Mode.

The host, having received the ISB (22) from the peripheral as it was sending the Enter IRM Command (18), is prepared to respond to the interrupt. As will also be described in greater detail below, the host continues the interrupt service by decoding the ISB (22) and responding with the appropriate number of "continue" code bytes (24) depending on the contents of the ISB (22). The peripheral will then continue to supply status or data bytes (26) appropriate to the source of the interrupt. As is typical in SPI, such transfers occur substantially simultaneously.

It can thus be seen that by encoding the pending peripheral interrupts for the purposes of prioritization, the method and system of the present invention allow both the host and the peripheral to know exactly what actions are to be taken from the start of communication, thereby greatly increasing the efficiency of such communication. In contrast, pending peripheral interrupts in prior art SPI methods and systems are not differentiated. As a result, a host is forced to read additional data (e.g., multiple registers and/or bits) to decide which pending peripheral interrupt has priority. Thereafter, the host must then communicate such information to the peripheral. Such communications entail the transfer of address data, followed by the transfer of actual status or control data, followed by additional steps.

Referring again to FIG. 1, Interrupt Response Mode is terminated with the rising edge (28) of CS (10), which also clears the interrupt status just read. Interrupt Response Mode will also be terminated by any early release (i.e., rising edge) (30) of CS (10). Such an early termination of the Interrupt Response Mode results in an incomplete resolution of the peripheral interrupt. That is, all actions undertaken prior to the early termination are considered not to have taken place. The peripheral interrupt will continue to pend, and will be serviced at a later time in the manner described in detail above.

Moreover, if the host transmits an "Enter IRM" command as a result of noise on the interrupt line rather than an actual interrupt request, the peripheral will return the ISE with no pending interrupts indicated and will not enter Interrupt Response Mode. More specifically, noise on the interrupt line may result in activation (20) of CS (10) followed by an Enter IRM Command (18) while the ISE (22) contains no active interrupt bits. Once again, however, in that instance the peripheral will not enter Interrupt Response Mode.

Figure 2:
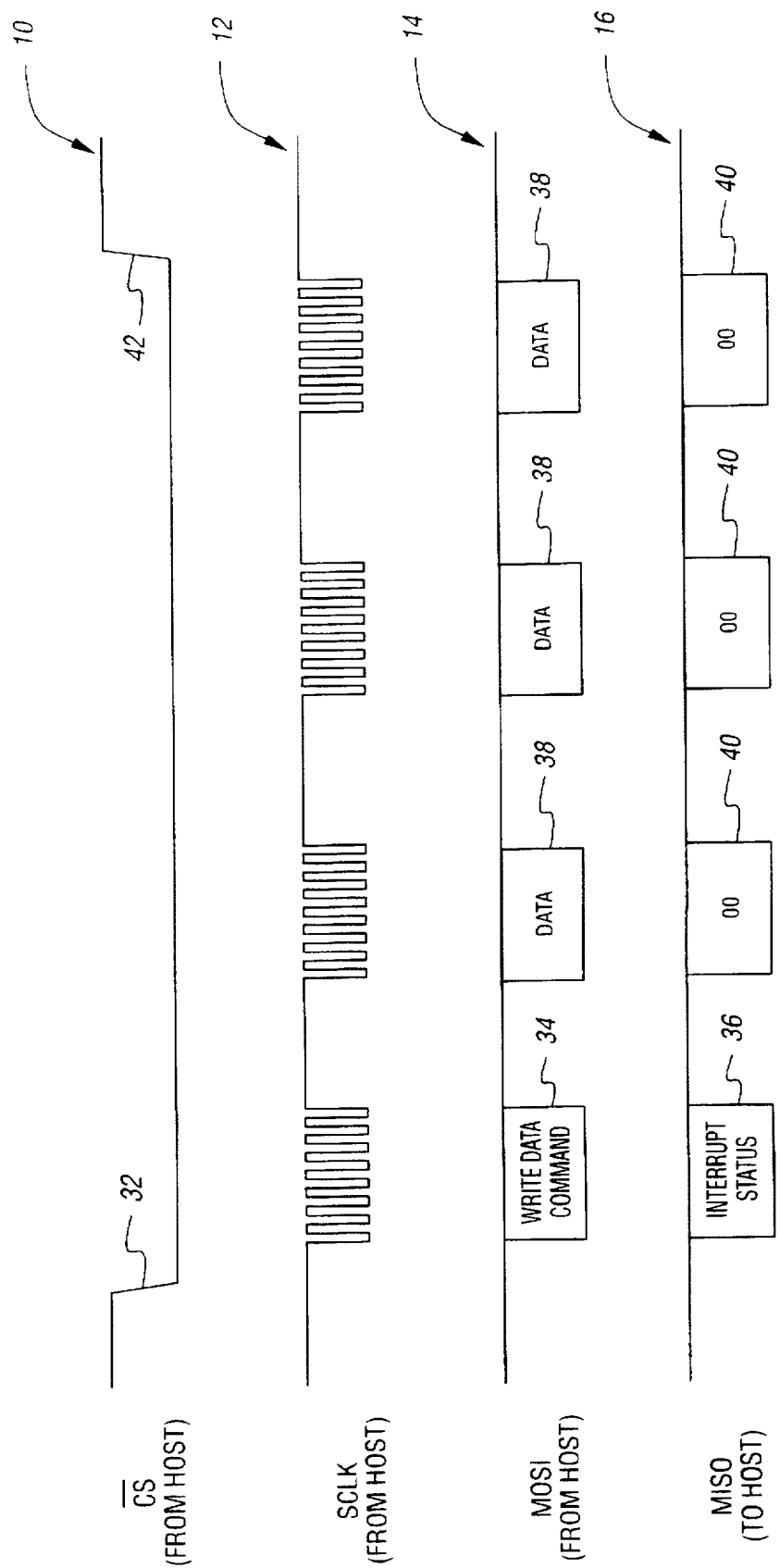
FIG. 2 illustrates a typical command mode transaction for use in the method and system of the present invention.

Referring next to FIG. 2, a typical command mode transaction for use in the method and system of the present invention is shown. Once again, as seen therein, a number of typical SPI host/peripheral interface signal lines are depicted over time including a chip select (CS) line (10) from the host to the peripheral, a serial clock (SCLK) line (12) originating from the host, a unidirectional data line (MOSI) (14) from the host to the peripheral, and a unidirectional data line (MISO) (16) from the peripheral to the host.

Command mode is entered whenever the first byte sent from the host after CS (10) is asserted (32) is not an Enter IRM Command, regardless of the state of any pending peripheral interrupts. This means that commands to the peripheral will be accepted even when the interrupt line (not shown) is asserted by the peripheral. As seen in FIG. 2, command mode is used whenever the host writes data to the peripheral. It should be noted, however, that command mode may also be used in conjunction with "read data" or other commands (see FIG. 3).

More specifically, the first byte sent from the host after CS (10) is asserted (32) may be a write data command (34), which causes the peripheral to enter command mode. As is readily apparent, CS (10) is used to control transactions with the peripheral. The active (high to low) edge (32) of CS (10) is used by the peripheral to reset the SPI bit counter to zero, and to route the next serial byte into the command register (60) (see FIG. 3) for decoding. In addition, the peripheral always sends the ISB (36) to the host as the host clocks over the first byte (34) after CS (10) is asserted (32). Due to the bidirectional, full duplex nature of the SPI interface, ISB (34) will always be placed into the host's SPI receive register after the first byte is sent from the host, whether the host is responding to an interrupt or commanding some action.

Thereafter, the host will continue to transmit data bytes (38) appropriate to the write data command. Such data bytes (38) will be written to the appropriate data registers within the peripheral device. Moreover, as a result of entry into the command mode, no further status information will be contained in the bytes (40) transmitted substantially simultaneously from the peripheral to the host as part of SPI.

For either interrupt response or command mode, it should be noted that only one command transaction (e.g., "write data", "read data", "enter IRM", or other command) is allowed during a single assertion (32) of CS (10). That is, CS (10) must be de-asserted between commands. Once the data transaction has been completed, the host de-asserts CS (10). For interrupt response mode specifically, when the peripheral detects the release (42) of CS (10), it considers the previous status resolved if all pertinent data has been transmitted to the host. Otherwise, the previous status is considered incomplete as described above. When the previous status is considered resolved, the peripheral then updates the status register with the next highest priority status within the device, or clears the status register if there are no remaining conditions which require service from the host processor.

It can thus be seen that the data transfer modes of the method and system of the present invention increase the efficiency of serial communication between a host and a peripheral by utilizing the otherwise wasted first byte received from the peripheral as the host transmits the command byte to the peripheral. Moreover, the communication modes of the method and system of the present invention described above will not propagate data errors which may be caused by a noisy environment. That is, in contrast to the prior art, the communication modes of the present invention allow for data verification.

Communication efficiency is also increased by establishing a set of pre-defined data transfers based on the existing highest priority interrupt within the peripheral. This eliminates the need for the host to address those status and data location of interest to the host, since they are selected and returned automatically to the host when the host uses the common "continue" code. That is, the Interrupt Response Mode of the present invention acts as a read operation where the necessary addresses are generated by the peripheral rather than requested by the host.

In the following examples, and in the preferred embodiment of the present invention, the peripheral device comprises an automotive network protocol controller. However, those of ordinary skill in the art will recognize that the present invention is equally suitable for use with any other type of peripheral device, such as Universal Asynchronous Receiver/Transmitters (UART), power driver controllers, and others.

Figure 3:
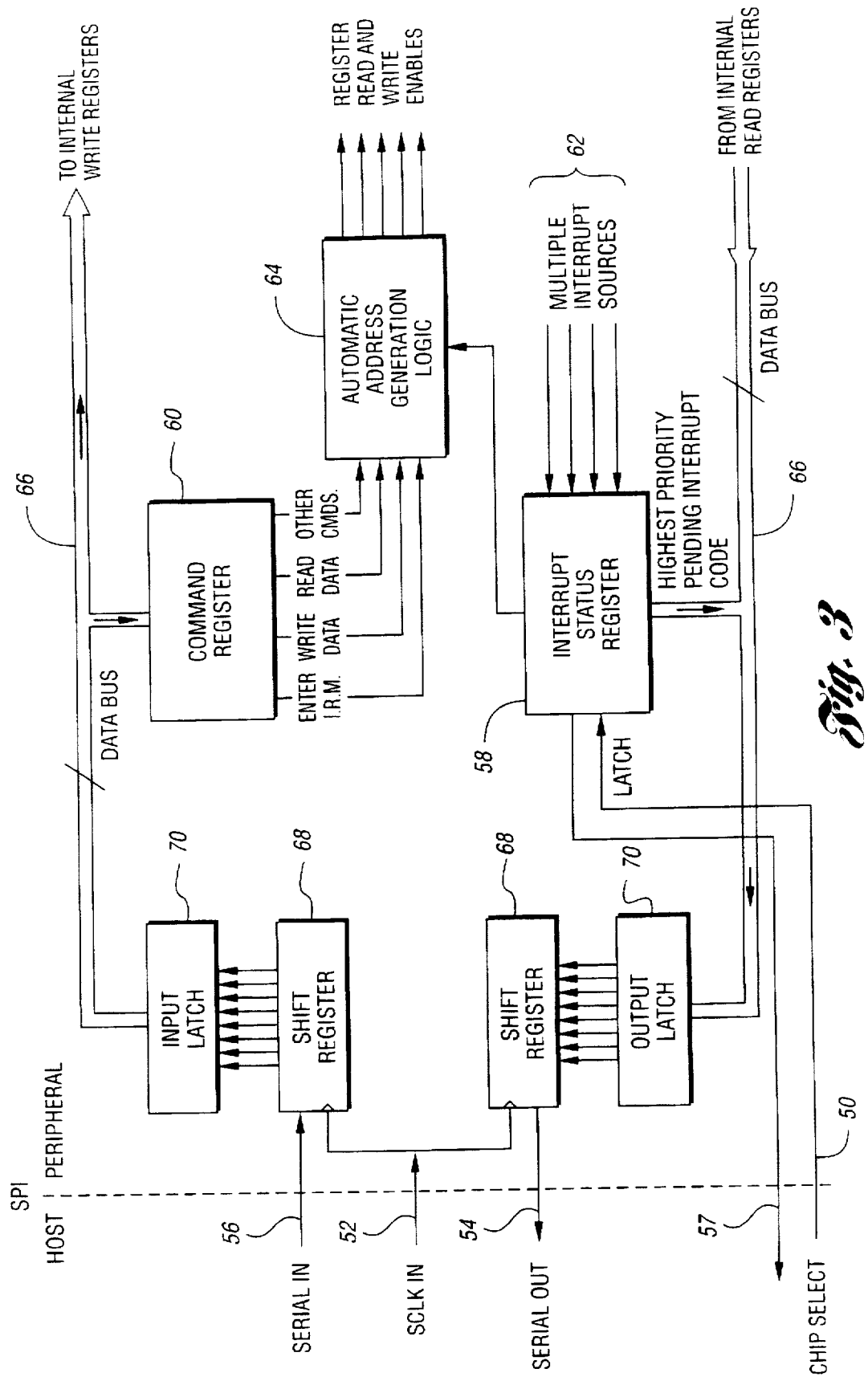
FIG. 3 illustrates a simplified block diagram of the serial interface of the system of the present invention.

As an example, in a peripheral which has four separate sources of interrupts, the highest priority interrupt of these four (assuming all were pending at the same time) would be indicated in the Interrupt Status Register (58) (See FIG. 3). When the host issues any command to the peripheral, this status byte is returned to the host as the host is clocking over the command byte.

Thereafter, if the host has commanded the peripheral to "enter interrupt response mode" with the command byte, the peripheral will automatically fetch the appropriate internal status and/or data registers associated with the interrupt. The host then simply reads these additional status and/or data bytes with a single code (called "continue").

More specifically, the ISB is provided with a predefined format. Preferably, the upper nibble thereof is used to indicate one of four possible interrupt sources. In that regard, any one of the four bits of the upper nibble may be set to indicate one of the four interrupt sources (i.e., "0001", "0010", "0100", or "1000"). In such a fashion, the ISB may also be utilized for error detection. That is, those of ordinary skill in the art will recognize that only two bits are required to identify one of four possible interrupt sources (i.e., "00", "01", "10", or "11"). By using four bits, however, a communication error can be identified if more than one bit in the upper nibble has been set. In the event of such an error, early termination of the interrupt service is undertaken as described in detail above with respect to FIG. 1.

The lower nibble of the ISB is preferably used to provide various information relating to the specific interrupt from the source identified by the upper nibble. In that regard, the lower nibble of the ISB may indicate the number of data bytes relating to the interrupt that the host should retrieve, an error status, or other information. Of course, those of ordinary skill in the art will recognize that all or any portion of the lower nibble (and/or the upper nibble) could also be used for interrupt source identification. That is, up to all eight bits of the ISB could be used to identify up to eight interrupt sources in the fashion described above.

Thus, by decoding the ISB, the host identifies the source of the interrupt, checks for communication errors, and is provided with information relating to the specific interrupt pending. The host thus knows what actions are appropriate to that interrupt, and is prepared to undertake such actions if it has sent an "Enter IRM" command to the peripheral while it was receiving the ISB.

Moreover, the identity of the source of the interrupt also serves to define the type, order and/or amount of information returned by the peripheral to the host in response to the "Enter IRM" command, and/or any "continue" codes from the host. That is, knowing the source of the interrupt and that the host is prepared to service the interrupt request, the peripheral can immediately prepare to return information associated with the interrupt to the host, without waiting for further instruction from the host. More specifically, in the Interrupt Response Mode the addresses of the information to be transferred are generated by the peripheral rather than requested by the host. In such a fashion, the method and system of the present invention overcome the problems associated with the prior art to provide a more efficient serial based communication mode.

For example, the predefined data format of the ISB sent to the host from the peripheral may indicate "received message available" in the upper nibble thereof, as well as a byte count associated with that message in the lower nibble thereof. Assuming a byte count of four, the host would then send four "continue" codes to the peripheral in order to retrieve the message. Such a transaction represents a five byte transfer.

Alternatively, the predefined data format of the ISB sent to the host from the peripheral may indicate "exception" in the upper nibble thereof if some problem exists. This indicates that the host should retrieve one more byte to obtain more specific information concerning the exception. In that event, the host would then send one "continue" code to the peripheral in order to obtain such information, which is returned to the host from an exception register in the peripheral. Such a transaction represents a two byte transfer.

In yet another example, the predefined data format of the ISB sent to the host from the peripheral may indicate "transmit complete" in the upper nibble thereof, with no error status in the lower nibble thereof. In that event, no further data or commands would be transmitted by the host to the peripheral. That is, while the host may have sent an "Enter IRM" command simultaneous to the peripheral sending the ISB to the host, no further data is transmitted thereafter. Such a transaction represents a single byte transfer.

Referring now to FIG. 3, a simplified block diagram of the serial interface of the system of the present invention is shown. As seen therein, the serial peripheral interface (SPI) between the host and the peripheral comprises a five wire interface which includes a chip select line (50) from the host to the peripheral, a serial clock line (52) originating from the host, a unidirectional data line (54) from the host to the peripheral, and a unidirectional data line (56) from the peripheral to the host. An interrupt line (57) is also provided from the peripheral to the host microprocessor. Once again, this represents a typical SPI.

The system of the present invention further comprises a single byte interrupt status register (58) which contains a code representing the highest priority interrupt or other status information pertinent to the operation of the peripheral. Only one status condition is represented by status register (58) at any given time, although that status may change based on conditions within the peripheral. However, the contents of status register (58) are latched and held stable whenever the host activates the chip select line (50). Further, the contents of status register (58) remain unchanged until the host eventually releases chip select (50) at the end of the data transaction. Interrupt status register (58) is also provided with interrupt priority resolution logic which, as described in detail above, prioritizes pending peripheral interrupts received from multiple interrupt sources (62).

Still referring to FIG. 3, the system of the present invention also includes a single byte command register (60), which is written by the host. The command register (60) always receives the first serial byte transferred to the peripheral after the assertion of chip select (50). The contents of status register (58) are transmitted to the host as the host writes data to command register (60). In this fashion, the host is provided with a unique status condition of the peripheral whenever the host initiates any command to the peripheral, thereby eliminating any need to address a status register internal to the peripheral.

Command register (60) includes a command decoder and is provided in communication with an automatic address generator (64). The command decoder of command register (60) comprises appropriate control logic to implement the command mode and interrupt response mode data sequences previously described. Automatic address generator (64) is itself provided in communication with interrupt status register (58) and includes appropriate control logic to route data from the internal peripheral addresses to the host based upon IRM and the status existing in status register (58).

As those of ordinary skill in the art will recognize, the previously described elements of the system of the present invention comprise means for performing the method of the present invention detailed above with respect to FIGS. 1 and 2. In that same regard, the appropriate data busses (66), shift registers (68), and input/output latches (70) depicted in FIG. 3 comprise further means for performing the method of the present invention.

As is readily apparent from the foregoing description, then, the present invention provides an improved method and system for serial communication between a host device and a peripheral device. More specifically, the present invention provides a method and system for serial communication between a host device and a peripheral device that improves the efficiency of data transfer. While such data transfers have been described in the preferred embodiment as bytes, those of ordinary skill in the art will recognize that the method and system of the present invention are suitable for use with serial data transfers of any type or size.

It is to be understood that the present invention has been described in an illustrative manner, and that the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described.

What is claimed is:

1. A method for serial communication between a host device and a peripheral device, the method comprising:
   (a) transmitting an interrupt command from the host to the peripheral in response to a peripheral interrupt signal;
   (b) transmitting, substantially simultaneously to (a), interrupt status data from the peripheral to the host, the interrupt status data representing a pending peripheral interrupt and indicating whether a communication error has occurred;
   (c) transmitting a continue code from the host to the peripheral based on the interrupt status data; and
   (d) transmitting, substantially simultaneously to (c), information associated with the pending interrupt from the peripheral to the host in response to the interrupt command, the information having a predefined structure based on the interrupt status data for use in resolution of the pending interrupt.

2. The method of claim 1 wherein the pending peripheral interrupt is one of a plurality of pending peripheral interrupts and has a priority exceeding that of any other of the plurality of pending peripheral interrupts.

3. The method of claim 2 further comprising retaining another pending peripheral interrupt having a priority less than the priority of the pending peripheral interrupt until resolution of the pending peripheral interrupt.

4. The method of claim 3 further comprising updating the interrupt status data upon resolution of the pending peripheral interrupt so that the interrupt status data represents the another pending peripheral interrupt.

5. The method of claim 1 further comprising clearing the interrupt status data upon resolution of the pending peripheral interrupt.

6. The method of claim 1 further comprising:
   (e) transmitting another continue code from the host to the peripheral; and
   (f) transmitting, substantially simultaneously to (e), additional information associated with the pending interrupt from the peripheral to the host in response to the continue code, the additional information having a predefined structure based on the interrupt status data for use in resolution of the pending interrupt.

7. The method of claim 6 wherein the pending peripheral interrupt is one of a plurality of pending peripheral interrupts and has a priority exceeding that of any other of the plurality of pending peripheral interrupts.

8. The method of claim 7 further comprising retaining another pending peripheral interrupt having a priority less than the priority of the pending peripheral interrupt until resolution of the pending peripheral interrupt.

9. The method of claim 8 further comprising updating the interrupt status data upon resolution of the pending peripheral interrupt so that the interrupt status data represents the another pending peripheral interrupt.

10. The method of claim 6 further comprising clearing the interrupt status data upon resolution of the pending peripheral interrupt.

11. A system for serial communication between a host device and a peripheral device, the system comprising:
   means for transmitting an interrupt command from the host to the peripheral in response to a peripheral interrupt signal;
   means for transmitting, substantially simultaneously to transmission of the interrupt command, interrupt status data from the peripheral to the host, the interrupt status data representing a pending peripheral interrupt and indicating whether a communication error has occurred;

means for transmitting a continue code from the host to the peripheral based on the interrupt status data; and means for transmitting, substantially simultaneously to transmission of the continue code, information associated with the pending interrupt from the peripheral to the host in response to the interrupt command, the information having a predefined structure based on the interrupt status data for use in resolution of the pending interrupt.

12. The system of claim 11 wherein the pending peripheral interrupt is one of a plurality of pending peripheral interrupts and has a priority exceeding that of any other of the plurality of pending peripheral interrupts.

13. The system of claim 12 further comprising means for retaining another pending peripheral interrupt having a priority less than the priority of the pending peripheral interrupt until resolution of the pending peripheral interrupt.

14. The system of claim 13 further comprising means for updating the interrupt status data upon resolution of the pending peripheral interrupt so that the interrupt status data represents the another pending peripheral interrupt.

15. The system of claim 11 further comprising means for clearing the interrupt status data upon resolution of the pending peripheral interrupt.

16. The system of claim 11 further comprising:

means for transmitting another continue code from the host to the peripheral; and means for transmitting, substantially simultaneously to transmission of the another continue code, additional information associated with the pending interrupt from the peripheral to the host in response to the continue command, the additional having a predefined structure based on the interrupt status data for use in resolution of the pending interrupt.

17. The system of claim 16 wherein the pending peripheral interrupt is one of a plurality of pending peripheral interrupts and has a priority exceeding that of any other of the plurality of pending peripheral interrupts.

18. The system of claim 17 further comprising means for retaining another pending peripheral interrupt having a priority less than the priority of the pending peripheral interrupt until resolution of the pending peripheral interrupt.

19. The system of claim 18 further comprising means for updating the interrupt status data upon resolution of the pending peripheral interrupt so that the interrupt status data represents the another pending peripheral interrupt.

20. The system of claim 16 further comprising means for clearing the interrupt status data upon resolution of the pending peripheral interrupt.

* * * * *